United States Patent [19]
Ziegenhain

[11] 3,987,155
[45] Oct. 19, 1976

[54] HIGH-POROSITY, HIGH-SURFACE AREA, LOW-BULK DENSITY ALUMINA

[75] Inventor: William C. Ziegenhain, Ponca City, Okla.

[73] Assignee: Continental Oil Company, Ponca City, Okla.

[22] Filed: Mar. 17, 1975

[21] Appl. No.: 558,865

Related U.S. Application Data

[63] Continuation-in-part of Ser. No. 246,028, April 20, 1972, abandoned, and a continuation-in-part of Ser. No. 191,085, Oct. 20, 1971, abandoned.

[52] U.S. Cl. .............................. 423/628; 252/463; 423/630
[51] Int. Cl.² ............................................ C01F 7/02
[58] Field of Search ............... 423/628, 630, 625; 252/463

[56] References Cited
UNITED STATES PATENTS

| | | | |
|---|---|---|---|
| 2,970,891 | 2/1961 | Hinlicky | 423/630 |
| 3,264,063 | 8/1966 | Carter | 423/630 |
| 3,394,990 | 7/1968 | Weingaertner | 423/630 |
| 3,419,352 | 12/1968 | Aceiani | 423/630 |
| 3,577,353 | 5/1971 | White | 252/465 |

FOREIGN PATENTS OR APPLICATIONS

| | | | |
|---|---|---|---|
| 1,903,066 | 9/1970 | Germany | 423/630 |

*Primary Examiner*—Herbert T. Carter
*Attorney, Agent, or Firm*—F. Lindsey Scott

[57] ABSTRACT

A high-porosity, high-surface area, low-density alumina and a method for preparing said alumina. The alumina typically has a surface area from about 260 to about 400 m²/g, a pore volume from about 1.0 to about 2.75 cc/g, a loose bulk density from about 7.5 to about 25 lb/ft³, and is produced by contacting aqueous alumina slurries with an effective amount of an organic solvent and drying the resulting solvent-aqueous alumina mixture.

6 Claims, 2 Drawing Figures

3,987,155

HIGH-POROSITY, HIGH-SURFACE AREA, LOW-BULK DENSITY ALUMINA

BACKGROUND OF THE INVENTION

This application is a continuation-in-part of my earlier filed application entitled "High-Porosity, High-Surface Area, Low-Bulk Density Alumina," Ser. No. 246,028, filed Apr. 20, 1972, and Ser. No. 191,085 of the same title, filed Oct. 20, 1971, both now abandoned.

FIELD OF THE INVENTION

This invention relates to low-density, high-porosity, high-surface area alumina. This invention further relates to a method for the production of such alumina. This invention also relates to a method for producing such alumina from aqueous alumina slurries by contacting such slurries with an organic solvent. This invention further relates to a method for producing low-density, high-porosity, high-surface area alumina from aqueous alumina slurries by contacting such slurries with an organic solvent.

DESCRIPTION OF THE PRIOR ART

Numerous processes such as the water hydrolysis of aluminum alkoxides, the alum process, and sodium aluminate processes are known for the production of alumina. Such alumina has a variety of uses such as for catalysts, catalyst supports, and the like. In many of these applications the usefulness of the alumina is directly related to its pore volume, surface area, and density. Generally lighter alumina having low-bulk density high-surface area, and high-porosity is more desirable. Most processes known heretofore produce alumina having loose bulk densities greater than about 35 lb/ft$^3$, pore volume of less than about 1.0 cc/g and surface areas lower than about 275 m$^2$/g. Some processes have produced lighter alumina having high-pore volume, but a large proportion of such pore volume is often in the form of macropores having a pore diameter greater than 10,000 A and is of little value for catalytic purposes. Articles by Kistler, S. S., Journal of Physical Chemistry 36, 52 (1932), and by Johnson, M. F. L., and Mooi, J., Journal of Catalysis, 10, 342–354 (1968), present theoretical discussions of aerogel alumina formation and the production of low-density alumina aerogels by the use of a methanol treatment. Alumina having a pore volume of approximately 0.4 cc/g is shown. The articles do not discuss solvents other than methanol, nor do they suggest that higher pore volumes are attainable by the use of other solvents.

German Pat. Nos. 1,230,410, 1,191,353, and 1,170,388 disclose the concept of removing alcoholic reaction products from alumina filtercake produced by water hydrolysis of aluminum alkoxides. The alcoholic reaction product is removed by contacting the alumina filtercake with an organic solvent. These references are directed to the removal of organic contaminants and do not show that a low density alumina product is obtained. In German Pat. No. 1,191,353 solvents such as hydrocarbons and low molecular weight alcohols are suggested. The low molecular weight alcohols include materials suitable for use in the process of the present invention.

U.S. Pat. No. 3,394,990 issued to Weingartner July 30, 1968, shows a process for the hydrolysis of aluminum alkoxides including washing the alumina filtercake with butanol. There is no indication that the butanol wash will result in lighter alumina and the primary objective noted is the removal of organic reaction product from the alumina filtercake.

U.S. Pat. No. 3,577,353, issued May 4, 1971, to White is also considered pertinent to this discussion.

As noted above, lighter alumina having high porosity and surface area is desirable in many applications such as catalysts, catalytic coatings, and the like. Therefore, much effort has been devoted to the development of method for producing such lighter alumina.

OBJECTS OF THE INVENTION

It is an object of this invention to provide a method for the production of alumina having a loose bulk density less than about 35 lb/ft$^3$, a pore volume greater than about 1.0 cc/g, and a surface area greater than about 275 m$^2$/g. A further object of this invention is a method for producing such alumina from aqueous alumina slurries. A further objective of this invention is a method for producing such alumina by contacting such aqueous alumina slurries with an organic solvent. A still further objective of this invention is a method for producing such alumina from aqueous alumina slurries produced by the hydrolysis of aluminum alkoxides.

SUMMARY OF THE INVENTION

It has now been found that the objectives of the present invention are realized by a process comprising:

a. mixing an aqueous alumina slurry with an effective amount of an organic solvent selected from the group consisting of ethanol, propanol, isopropanol, butanol, isobutanol, and tertiary butanol and b. drying the resulting solvent-aqueous alumina slurry to produce low-density, high-porosity, high-surface area alumina having a loose bulk density from about 7.5 to about 25 lb/ft$^3$, a surface area from about 275 to 400 m$^2$/g, and a pore volume* from about 1.0 to about 2.75 cc/g.

*All pore volumes are 0–10,000 A and were determined by the mercury penetration method unless otherwise stated.

DESCRIPTION OF THE INVENTION

Figure 1:
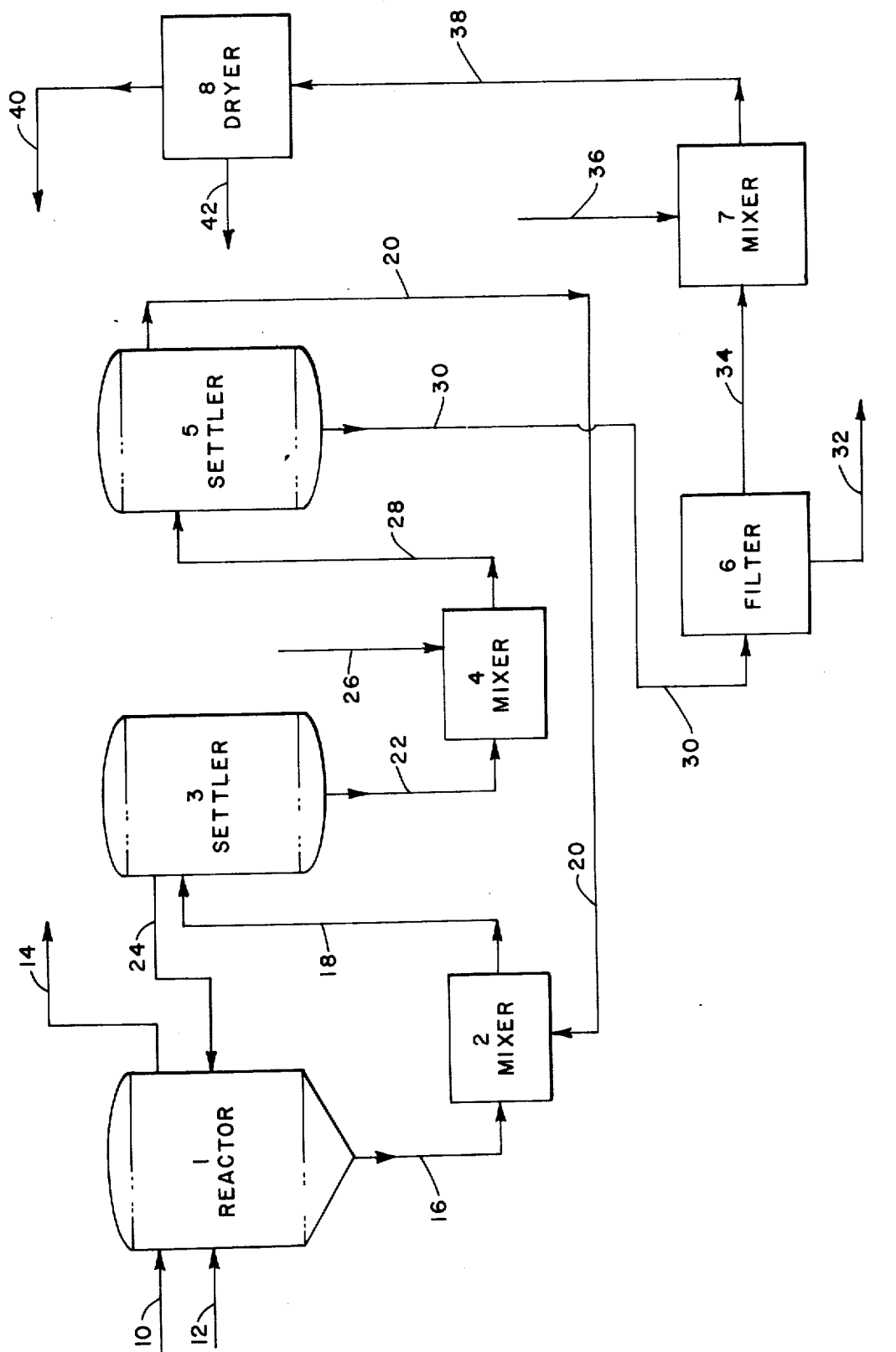
FIG. 1 is a flow diagram showing a typical embodiment of the present invention.

Alumina is generally useful for a variety of catalytic and refractory applications. The alumina produced by the method of the present invention is useful for a variety of uses related to its catalytic utility such as chemical process catalysts and catalyst supports, catalyst linings for mufflers, and the like. In many of these uses it will be desirable to add catalytic materials such as metallic ions, finely divided metals, cations, and the like to the alumina. Such additions may be achieved by adding the catalytic materials to the alumina at the reaction forming the alumina by addition to the aqueous alumina prior to or during contacting with the organic solvent, by coating the alumina product with catalytic material by immersing in solutions containing the catalytic material, and the like. Other and additional methods of modifying the alumina may appear obvious or desirable to those skilled in the art.

Alumina useful in catalytic applications has been produced heretofore by a variety of processes such as the water hydrolysis of aluminum alkoxides, precipitation of alumina from alum, sodium aluminate processes, and the like. Generally speaking such alumina while useful for catalytic uses has not been as desirable as the alumina produced by the method of the present invention, i.e., the surface areas, pore volumes, and low bulk densities of the alumina produced by the method of the present invention are not generally achieved, especially by the first two processes listed.

The aqueous alumina slurries suitable for use in the method of the present invention are those containing up to about 32 weight percent alumina as $Al_2O_3$ wherein said alumina has not previously been dried subsequent to its production from the raw materials used, i.e., aluminum alkoxides, alum, alkali metal aluminates, and the like. Some dispersible aluminas where redispersed and treated according to the method of the present invention show improvements in desirable properties but are not substantially improved by comparison to comparable alumina which has not been previously dried. It has been found that aqueous alumina slurries can be concentrated by drying and the like to about 32 weight percent $Al_2O_3$ prior to treatment by the method of the present invention without substantial loss in the desirable product parameters. Above about 32 weight percent $Al_2O_3$, losses in product quality were apparent. Preferred slurry compositions are from about 10 to about 20 weight percent $Al_2O_3$.

Slurry as used herein refers to alumina mixtures with water, etc, in widely varying amounts. The mixtures containing small amounts of alumina are very fluid whereas the mixtures containing higher amounts of alumina may appear as a semi-solid material. Slurry is used to describe all such mixtures within the stated composition ranges.

In a preferred embodiment of the present invention an alumina slurry as described above is filtered to produce a filtercake containing about 16 weight percent $Al_2O_3$ and thereafter mixed with an effective amount of a suitable solvent. The solvent-aqueous alumina mixture is then dried to produce a high-porosity, high-surface area, low-bulk density alumina. The mixing may be performed by various methods, i.e., the aqueous alumina slurry may be mixed with an effective amount of a suitable solvent and dried, the aqueous alumina slurry may be filtered, mixed with an effective amount of a suitable solvent, and dried; successive solvent contacts and filtrations may be used prior to drying and the like.

Figure 2:
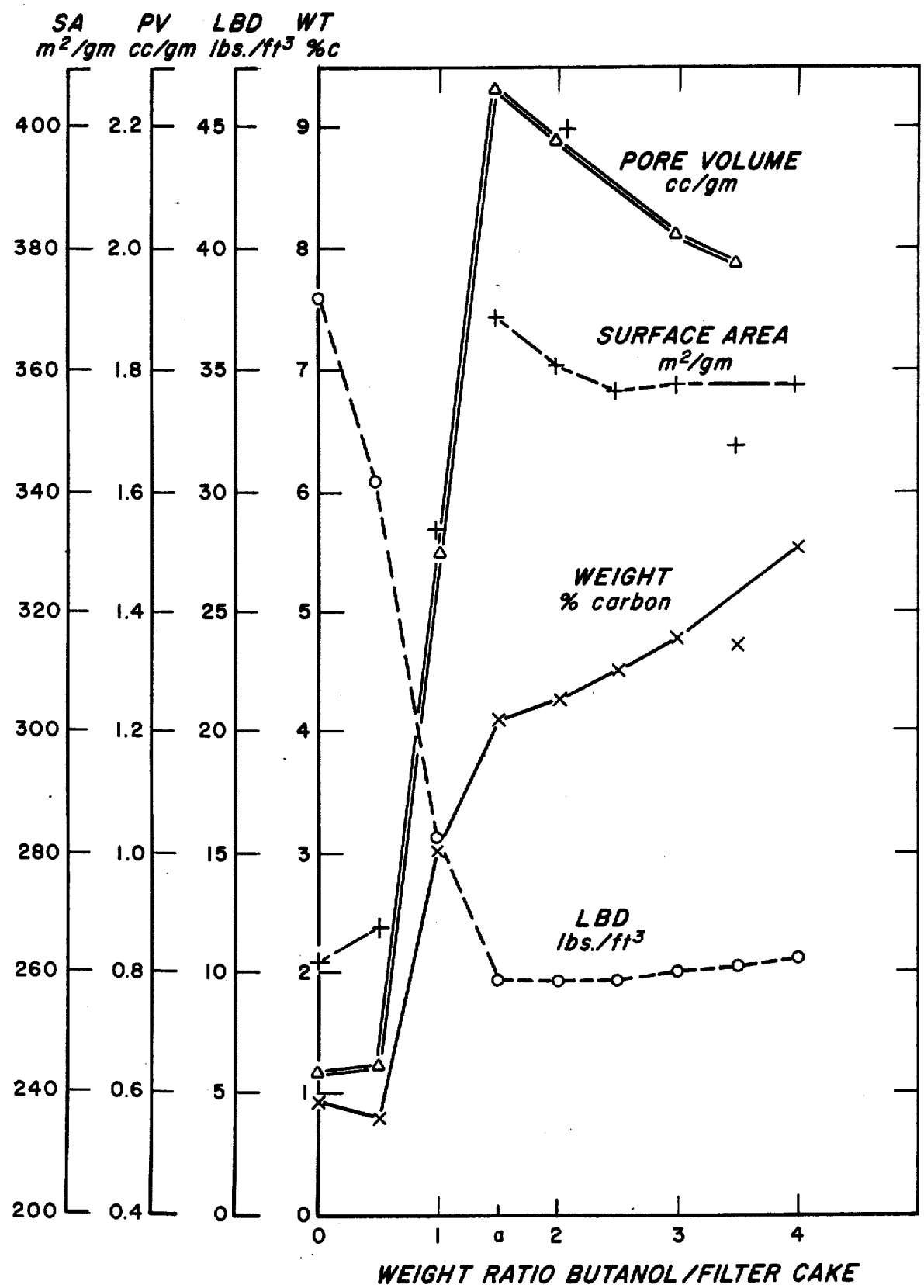
FIG. 2 is a graph showing the variation in alumina properties as a function of the amount of solvent mixed with an aqueous alumina filtercake prior to drying.

In FIG. 2 varying amounts of n-butanol were mixed with an aqueous alumina filtercake containing about 15 weight percent $Al_2O_3$ to form n-butanol—aqueous alumina slurries of varying n-butanol content. The slurries were then dried and the properties of the alumina produced were determined. The most desirable alumina properties were obtained near the point (a) at which the amount of n-butanol added was sufficient to azeotropically remove the water from the aqueous alumina filtercake. Desirable alumina was produced when the amount of n-butanol added was an amount equal to at least 25 percent of the amount of n-butanol required to azeotropically remove the water present.

The method of contacting is effective when at least enough solvent is added to form a mixture of the solvent and the water present in the aqueous alumina portion so that the solvent is present in an amount equal to at least 25 percent of the solvent required to azeotropically remove the water upon drying. Lesser amounts of solvent may be used to achieve lesser improvement in alumina properties, but it has been observed that more desirable results are obtained when at least 25 percent and preferably at least 50 percent of the azeotropic amount is used. It has been found that desirable results are obtained when up to about 150 percent excess solvent is used. References to proportions of solvent to water, solvent to alumina filtercake, etc, as used herein are by weight unless otherwise stated.

For purposes of calculating the water present the alumina is treated as $Al_2O_3$, thus the water of hydration is treated as removable water even though such water is not usually removed in the early drying operations, i.e., usually an alumina hydrate such as alpha alumina monohydrate is the product from the first drying step although such alumina may be further dried or calcined to unhydrated alumina such as gamma alumina and the like. In the methods listed above, it is necessary to have the solvent-aqueous alumina mixture described above only in the mixture immediately prior to drying, i.e., prior washes or contacting can be at any desired ratio.

Suitable solvents are ethanol, propanol, isopropanol, butanol, isobutanol, and tertiary butanol. Other solvents such as methanol and acetone were tested but found to be less desirable in achieving the desired reductions in bulk density and increases in porosity and surface area. The listed solvents all yield desirable products, but based primarily on economics and availability the ethanol and butanol are preferred, and of the two, butanol is preferred over ethanol since it is present in many processes where the methods of the present invention are useful.

Azeotropic mixtures of the suitable solvents are as follows.

| Solvent* | Wt. % Solvent | Wt. % Water | B.P. ° C |
|---|---|---|---|
| Ethanol | 95.5 | 4.5 | 78.1 |
| Propanol | 71.7 | 28.3 | 87.7 |
| Isopropanol | 87.9 | 12.1 | 80.4 |
| n-Butanol | 62 | 38 | 92.4 |
| Isobutanol | 66.8 | 33.2 | 90.0 |
| Tertiary Butanol | 88.3 | 11.7 | 79.9 |

*Langes Handbook of Chemistry, Ninth Edition, pages 1484-1485.

It has been found that with butanol very desirable results are obtained when a 1.5:1.0 weight ratio of butanol to alumina filtercake containing about 10 to 20 weight percent of $Al_2O_3$ is used in the final drying step. Other solvents listed are not optimized, but by use of the azeotropic mixtures those skilled in the art will find no difficulty in selecting appropriate solvent-water ratios.

The use of greater amounts of solvent does not defeat the objectives of the present invention, but it has been observed with all solvents listed that upon increasing the solvent-water ratio substantially greater amounts of residual organic material, hereinafter referred to as residual carbon, remain on the alumina product. With butanol it has been observed that slight losses in surface area and porosity as well as slight increases in loose bulk density are observed when butanol-alumina slurry ratios greater than about 2.0:1 are used. Such higher ratios also result in substantial residual carbon increases. Thus the use of greater solvent ratios appears detrimental in some respects with no offsetting advantages.

Desirably the solvent is present in an amount equal to from about 25 to about 250 percent of that amount of solvent required to azeotropically remove all the water present in the solvent-aqueous alumina mixture upon drying. Preferably the solvent is present in an amount equal to from 50 to about 150 percent of the solvent required to azeotropically remove the water from the solvent-aqueous alumina mixture upon drying.

It should be noted that the solvent added need not be anhydrous but may contain water so long as the added material plus the water in the alumina slurry result in a suitable mixture.

The alumina produced by the method of the present invention has desirable properties for use as catalytic materials and the like, such as a loose bulk density from about 7.5 to about 25.0 lb/ft$^3$, a surface area from about 260 to about 400 m$^2$/g, and a pore volume from about 1.0 to about 2.75 cc/g. Preferred properties are a loose bulk density from about 9 to about 15 lbs/ft$^3$, a pore volume from about 1.5 to about 2.75 cc/g, and a surface area from about 300 to about 400 m$^2$/g. Such alumina is very desirable for catalytic uses. A further desirable property is that a high proportion, typically more than 50 percent of the pore volume, consists of pores smaller than 1000 A in diameter with a typical average pore diameter from about 80 to about 150 A.

A preferred method for the production of such alumina comprises:

a. reacting aluminum alkoxides having alkoxy groups containing from about 1 to about 30 carbon atoms in the alkoxide portion with an aqueous solution to produce an aqueous alumina slurry and an organic portion;

b. Separating the organic portion and the aqueous alumina slurry;

c. optionally further purifying the aqueous alumina slurry by solvent extraction, steam stripping, and the like to further remove any remaining minor portions of the organic portion; and d. mixing the aqueous alumina slurry with an effective amount of an organic solvent as discussed heretofore and as shown in FIG. 2.

In a typical embodiment shown in FIG. I, a mixture of aluminum alkoxides with alkoxy groups containing from about 1 to about 30 carbon atoms is charged to reactor 1 through line 10. Water containing streams are charged to reactor 1 through lines 12 and 24. The aqueous streams 12 and 24 contain substantial amounts of organic material such as butanol. The reaction products, organic alkoxide material such as alcohols and alumina in an aqueous slurry, are withdrawn through lines 14 and 16, respectively. The alumina slurry contains alumina, water, alcohols, and unreacted aluminum alkoxide material. The alumina slurry in line 16 is mixed with the overhead stream from settler 5 which is passed from settler 5 to mixer 2 through line 20. The overhead stream is primarily butanol saturated with water. The mixed aqueous alumina slurry and butanol are passed from mixer 2 to settler 3 through line 18 and allowed to separate into an aqueous alumina slurry and a water saturated butanol layer. The butanol layer is passed to reactor 1 through line 24 and the alumina slurry is withdrawn through line 22 and passed to mixer 4 where the alumina slurry is mixed with a butanol stream 26 which contains water up to a fully water saturated butanol water phase. The mixed aqueous alumina and butanol are passed to settler 5 through line 28 where a separation to a water saturated butanol phase and an aqueous alumina phase is effected. The aqueous alumina slurry is withdrawn through line 30 and the butanol phase is passed through line 20 to mixer 2. The aqueous alumina slurry in line 30 is substantially free of alkoxide material and alcohols heavier than butanol and is passed to filter 6 where an alumina filtercake containing typically about 16 weight percent $Al_2O_3$ is separated and passed through line 34 to a mixer 7. The water separated is discarded by way of line 32 or recycled as desired. In mixer 7 the aqueous alumina filtercake is mixed with a solvent, typically butanol, in an amount at least sufficient to form a butanol-water mixture with the water present in the alumina filtercake. The mixture from mixer 7 is passed through line 38 to dryer 8 where the alumina mixture is dried. The butanol-water vapor is recovered from line 40 and recycled or separated into its component parts and dry alumina is recovered through line 42.

It is pointed out that FIG. 1 is merely a typical embodiment and is not limiting except as stated. In particular the solutions added to mixers 2 and 4 by lines 20 and 26 may be water, water containing dissolved light alcohols containing from 1 to about 6 carbon atoms, alcohols containing from 1 to about 6 carbon atoms containing dissolved water, and the like. The aqueous alumina purification steps in mixers 2 and 4 and settlers 3 and 5 may be replaced by other purification steps such as treatment of the aqueous alumina slurry with other organic solvents, steam stripping, and the like. In some instances the purification may be omitted entirely although it is likely that alumina so produced will contain high carbon residues. In general the process may be modified in a variety of ways known to those skilled in the art within the contemplation of the present invention. What is preferred is the alumina slurry resulting from the water hydrolysis of aluminum alkoxides.

In the process for producing such alumina by the hydrolysis of aluminum alkoxides that same solvents are used in the solvent contacting procedure as listed above; however, butanol and ethanol are greatly preferred since they are readily available in most such processes.

The alumina so produced has desirable properties similar to those listed above and has a further advantage that the alumina so produced is extrudable upon drying to an $Al_2O_3$ content greater than 85 weight percent with only a slight loss in desirable properties. An extrusion process further detailing an extrusion method is shown in Ser. No. 191,091 entitled "Low-Density, High-Porosity Alumina Extrudates and a Method for Producing Said Extrudates" by Leach, Hritz, and Royer filed Oct. 20, 1971, and Ser. No. 268,246 of the same title filed July 3, 1972. This advantage is observed only in alumina produced by the method of the present invention using aqueous alumina slurries produced by the water hydrolysis of aluminum alkoxides. No satisfactory explanation for this unusual and unexpected property is now known.

Numerous process variations within the disclosure of the present invention may appear obvious or desirable to those skilled in the art based upon the foregoing description of the preferred embodiments and the following examples.

EXAMPLES

Tests were performed to evaluate the effectiveness of various solvents for reducing the loose bulk density (LBD) and increasing the pore volume of alumina. An alumina slurry produced by the water hydrolysis of aluminum alkoxides wherein the alkoxy groups contain from about 2 to about 30 carbon atoms and consist primarily of alkoxy groups containing even numbers of carbon atoms, and containing about 16 weight percent $Al_2O_3$, about 76 weight percent water, about 7.5 weight percent butanol, and about 0.5 weight percent ethanol was used for all tests unless otherwise stated. Such aqueous alumina slurries when dried from aqueous slurry typically yield dry alumina having a loose bulk density greater than about 35 lb/ft$^3$, a surface area lower than about 275 m$^2$/g, and a pore volume lower than about 1.0 cc/g.

The pore volumes shown in the following examples were determined by the mercury penetration technique using pressures up to about 50,000 psig. The tests were performed on a Mercury Porisimeter, Model 905-1, manufactured by the Micromeritics Corporation of Norcross, Georgia.

portions of alumina slurry were contacted with various amounts of solvent, filtered, and dried at about 250°–275° F. Other slurry portions were contacted, filtered, reslurried with an additional quantity of fresh solvent, filtered, and then dried. The results are shown in Table II.

TABLE II

| Test No. | Ratio Ethanol (g) Cake (g) | Washes No. | Surface Area m²/g | LBD lb/ft³ | Pore Vol. cc/g | Carbon Residue Wt % |
|---|---|---|---|---|---|---|
| 1 | 1.6 | 1 | 285 | 24.2 | 0.96 | 0.80 |
| 2 | 1.6 | 2 | 325 | 13.9 | 1.43 | 1.13 |
| 3 | 1.6 | 1 | 277 | 28.7 | 0.82 | 0.59 |
| 4 | 1.6 | 2 | 302 | 18.6 | 1.16 | 0.59 |
| 5 | 3.2 | 1 | 332 | 33.0 | 1.24 | 1.88 |
| 6 | 3.2 | 2 | 328 | 11.4 | 1.99 | 0.87 |
| 7 | 3.2 | 1 | 333 | 17.6 | 1.39 | 0.79 |
| 8 | 3.2 | 2 | 351 | 11.0 | 1.92 | 0.91 |
| 9 | 3.2 | 1 | 360 | 12.7 | 1.67 | 1.89 |
| 10 | 3.2 | 2 | 356 | 12.8 | 1.79 | 1.88 |

It is shown that the loose bulk density is reduced substantially and high-pore volumes and surface areas are obtained. Typical pore volume distributions in the alumina produced by the above tests are shown below.

TABLE II (a)

| | Cumulative Pore Volume Distribution (cc/g) | | | | | | | | | |
|---|---|---|---|---|---|---|---|---|---|---|
| Test No. | 1 | 2 | 3 | 4 | 5 | 6 | 7 | 8 | 9 | 10 |
| Pore Diameter A | | | | | | | | | | |
| 0–35 | <0.01 | <0.01 | <0.01 | — | — | — | — | — | 0.02 | 0.05 |
| 40 | 0.01 | 0.01 | 0.01 | 0.04 | 0.03 | 0.15 | 0.07 | 0.19 | 0.02 | 0.05 |
| 50 | 0.01 | 0.05 | 0.06 | 0.08 | 0.11 | 0.24 | 0.12 | 0.26 | 0.17 | 0.26 |
| 65 | 0.25 | 0.38 | 0.35 | 0.39 | 0.41 | 0.58 | 0.43 | 0.58 | 0.44 | 0.54 |
| 80 | 0.46 | 0.61 | 0.47 | 0.54 | 0.57 | 0.77 | 0.64 | 0.70 | 0.57 | 0.70 |
| 100 | 0.54 | 0.70 | 0.51 | 0.63 | 0.64 | 0.89 | 0.73 | 0.85 | 0.69 | 0.80 |
| 120 | 0.56 | 0.76 | 0.53 | 0.64 | 0.67 | 0.93 | 0.76 | 0.90 | 0.77 | 0.87 |
| 150 | 0.58 | 0.79 | 0.54 | 0.67 | 0.69 | 1.03 | 0.79 | 1.00 | 0.85 | 0.96 |
| 200 | 0.59 | 0.83 | 0.55 | 0.67 | 0.71 | 1.11 | 0.81 | 1.04 | 0.93 | 1.03 |
| 250 | 0.60 | 0.86 | 0.55 | 0.69 | 0.73 | 1.16 | 0.84 | 1.08 | 0.98 | 1.07 |
| 350 | 0.61 | 0.88 | 0.56 | 0.71 | 0.75 | 1.21 | 0.85 | 1.14 | 1.02 | 1.13 |
| 500 | 0.63 | 0.91 | 0.56 | 0.74 | 0.77 | 1.26 | 0.87 | 1.19 | 1.06 | 1.18 |
| 800 | 0.64 | 0.93 | 0.57 | 0.77 | 0.78 | 1.31 | 0.90 | 1.24 | 1.11 | 1.23 |
| 1000 | 0.67 | 0.97 | 0.58 | 0.80 | 0.82 | 1.35 | 0.91 | 1.30 | 1.15 | 1.27 |
| 2000 | 0.71 | 1.03 | 0.62 | 0.82 | 0.86 | 1.42 | 0.98 | 1.36 | 1.23 | 1.35 |
| 5000 | 0.83 | 1.19 | 0.71 | 0.97 | 1.03 | 1.60 | 1.12 | 1.61 | 1.42 | 1.56 |
| 10000 | 0.96 | 1.43 | 0.82 | 1.16 | 1.24 | 1.99 | 1.39 | 1.92 | 1.67 | 1.79 |

EXAMPLE I 500-gram portions of the cake were slurried with 1 liter of solvent, filtered, reslurried with an additional liter of fresh solvent, and dried at 250°–275° F. The results are shown in Table I.

TABLE I

| Solvent Used | None | Methanol | Ethanol | Iso-propanol | n-Butanol | Acetone |
|---|---|---|---|---|---|---|
| Product Properties: | | | | | | |
| Surface area, m²/gm | 259 | 328 | 346 | 336 | 356 | 281 |
| Loose Bulk Density, lbs/ft³ | 46.0 | 32.7 | 15.8 | 14.4 | 11.6 | 27.1 |
| Packed Bulk Density, lbs/ft³ | 58.7 | 42.0 | 22.3 | 21.6 | 12.5 | 36.0 |
| Alumina Content, wt. % | 81.8 | 80.4 | 81.9 | 77.6 | 76.7 | 80.9 |
| Cumulative Pore Volume | 0.50 | 0.90 | 1.52 | 1.49 | 2.05 | 1.06 |

Acetone and methanol gave substantially less reduction in loose bulk density and less increase in pore volume than the ethanol, isopropanol, and n-butanol.

EXAMPLE II

Tests were performed to demonstrate the effectiveness of ethanol treatment to reduce loose bulk density and increase pore volume and surface area. 500-gram

EXAMPLE III 500-gram portions of alumina slurry were mixed with varied amounts of n-butanol and dried. The results are shown below in Table III.

TABLE III

| Test No. | Ratio Butanol (g) Cake (g) | Surface Area m²/g | LBD Lb/ft³ | Pore Volume cc/g | Carbon Residue Wt % |
|---|---|---|---|---|---|
| 1 | 0 | 261.7 | 38.1 | .64 | 0.93 |
| 2 | 0.5 | 268.0 | 30.5 | .65 | 0.82 |
| 3 | 1.0 | 334.3 | 15.6 | 1.49 | 3.05 |
| 4 | 1.5 | 368.9 | 9.9 | 2.27 | 4.16 |
| 5 | 2.0 | 402.0 | 9.8 | 2.18 | 4.31 |

TABLE III-continued

| Test No. | Ratio Butanol (g) Cake (g) | Surface Area m²/g | LBD Lb/ft³ | Pore Volume cc/g | Carbon Residue Wt % |
|---|---|---|---|---|---|
| 6 | 3.0 | 358.3 | 10.2 | 2.03 | 4.82 |
| 7 | 3.5 | 348.3 | 10.4 | 1.96 | 4.75 |
| 8 | 4.0 | 357.7 | 10.7 |  | 5.58 |

Substantial reductions in loose bulk density were achieved, the pore volume was increased to greater than 2.0 cc/g, surface area increased substantially, and the carbon residue has been kept low. The pore volume distributions are shown below.

TABLE III (a)

| Test No. | Cumulative Pore Volume Distribution (cc/g) | | | | | | |
|---|---|---|---|---|---|---|---|
|  | 1 | 2 | 3 | 4 | 5 | 6 | 7 |
| Pore Diameter A | | | | | | | |
| 0–35 | | | | | | | |
| 40 | 0.03 | 0.00 | 0.00 | 0.12 | 0.00 | 0.00 | 0.00 |
| 50 | 0.21 | 0.14 | 0.00 | 0.35 | 0.21 | 0.17 | 0.18 |
| 65 | 0.40 | 0.34 | 0.35 | 0.58 | 0.42 | 0.45 | 0.45 |
| 80 | 0.44 | 0.39 | 0.50 | 0.71 | 0.48 | 0.55 | 0.50 |
| 100 | 0.45 | 0.42 | 0.60 | 0.81 | 0.56 | 0.69 | 0.58 |
| 120 | 0.46 | 0.43 | 0.68 | 0.91 | 0.62 | 0.79 | 0.65 |
| 150 | 0.47 | 0.44 | 0.75 | 1.00 | 0.72 | 0.88 | 0.72 |
| 200 | 0.48 | 0.45 | 0.81 | 1.13 | 0.85 | 1.02 | 0.83 |
| 250 | 0.48 | 0.45 | 0.87 | 1.27 | 0.96 | 1.16 | 0.94 |
| 350 | 0.49 | 0.45 | 0.92 | 1.46 | 1.15 | 1.24 | 1.07 |
| 500 | 0.50 | 0.46 | 0.94 | 1.67 | 1.30 | 1.39 | 1.17 |
| 800 | 0.50 | 0.47 | 1.00 | 1.79 | 1.42 | 1.48 | 1.31 |
| 1000 | 0.51 | 0.47 | 1.02 | 1.86 | 1.51 | 1.49 | 1.36 |
| 2000 | 0.53 | 0.51 | 1.10 | 1.97 | 1.67 | 1.58 | 1.53 |
| 5000 | 0.58 | 0.58 | 1.28 | 2.11 | 1.93 | 1.82 | 1.74 |
| 10000 | 0.64 | 0.65 | 1.49 | 2.27 | 2.18 | 2.03 | 1.96 |

EXAMPLE IV

Similar tests were performed using isobutanol. The results are shown below in Table IV.

TABLE IV

| Cake (g) | Iso-butanol (g) | Iso-butanol Cake | Pro-duct (g) | LBD lb/ft³ | Pore Vol. cc/g | Surface Area m²/g | Carbon Residue Wt % |
|---|---|---|---|---|---|---|---|
| 100 | 0 | — | 16.6 | 37.0 | 0.53 | 273.4 | 0.97 |
| 50 | 50 | 1.0 | 8.5 | 23.0 | 0.82 | 277.7 | 0.97 |
| 100 | 150 | 1.5 | 17.3 | 14.2 |  | 333.4 | 2.89 |
| 50 | 100 | 2.0 | 8.7 | 9.5 | 2.11 | 376.9 | 3.09 |
| 50 | 150 | 3.0 | 8.8 | 8.7 |  | 369.6 | 3.36 |

Substantial increases in surface area and pore volume were achieved as well as substantial reduction in the loose bulk density.

EXAMPLE V

Similar tests were performed using tertiary butanol. 500 grams of filtercake was slurried with 1 liter of t-butanol, filtered, reslurried with 1 liter of t-butanol, filtered, and dried. The product alumina is typified by the following properties:

| Loose bulk density | 16 lb/ft³ |
|---|---|
| Surface area | 360 m²/g |
| Pore Volume | 1.79 cc/g |

| Cumulative Pore Volume Distribution | |
|---|---|
| Pore Diameter A | Pore Volume cc/g |
| 0–35 | 0.01 |
| 40 | 0.02 |
| 50 | 0.09 |
| 65 | 0.44 |
| 80 | 0.60 |
| 100 | 0.71 |
| 120 | 0.82 |
| 150 | 0.93 |
| 200 | 1.02 |
| 250 | 1.09 |
| 350 | 1.16 |
| 500 | 1.21 |
| 800 | 1.26 |
| 1000 | 1.30 |
| 2000 | 1.42 |
| 5000 | 1.56 |
| 10000 | 1.79 |

EXAMPLE VI 575 grams of alkoxide, 620 grams of water, and 975 grams of isopropanol were poured together in a 5-liter flask and stirred at 100° F for 24 hours. The solution was then filtered through a polypropylene (130 mesh) filter cloth. The alumina filtercake was slurried with 500 ml of isopropanol, refiltered, reslurried with isopropanol, and refiltered. The product was then dried overnight at 250° F in a drying oven. The dried alumina properties are shown below.

| Wt % Carbon | 8.16 |
|---|---|
| Loose Bulk Density (lbs/ft³) | 18.8 |
| Surface Area (m²/gm)* | 369.3 |
| Pore Volume (cc/gm)* | 1.522 |
| Porosimetry Analysis, cc/gm* | |
| 0–35 A | .0562 |
| 40 | .1908 |
| 50 | .3060 |
| 65 | .3682 |
| 80 | .4076 |
| 100 | .4628 |
| 120 | .5160 |
| 150 | .5832 |
| 200 | .6848 |
| 250 | .7658 |
| 350 | .9209 |
| 500 | 1.0674 |
| 800 | 1.2808 |
| 1000 | 1.3480 |

| | |
|---|---|
| 2000 | 1.4084 |
| 5000 | 1.4770 |
| 10000 | 1.5220 |

*Determined on product calcined for three hours at 900° F after drying at 250° F.

EXAMPLE VII 575 grams of alkoxide, 620 grams of water, and 975 grams of isopropanol were added to a 5-liter flask. The mixture was heated to 100° F for 4 hours. The temperature was then raised to 160° F for one hour. A phase split was made and two consecutive washes with 500 ml of n-butanol were made on the aluminum phase at 140°–160° F. The alumina product was then dried at 250° F for 12–16 hours. The product properties are shown below.

| | |
|---|---|
| Wt % Carbon | 7.27 |
| Loose Bulk Density (lb/ft³) | 18.5 |
| Surface Area (m²/gm)* | 380.7 |
| Pore Volume (cc/gm) at 10000 A* | 1.4349 |
| Porosimetry Analysis, cc/gm* | |
| 0–35 A | .0738 |
| 40 | .2531 |
| 50 | .3383 |
| 65 | .3841 |
| 80 | .4378 |
| 100 | .5019 |
| 120 | .5615 |
| 150 | .6427 |
| 200 | .7743 |
| 250 | .8817 |
| 350 | 1.0629 |
| 500 | 1.1644 |
| 800 | 1.2339 |
| 1000 | 1.2758 |
| 2000 | 1.3275 |
| 5000 | 1.3851 |
| 10000 | 1.4349 |

*Determined on samples calcined for 3 hours at 900° F after drying.

EXAMPLE VIII

Tests were performed using alumina slurries of alumina produced by processes other than the hydrolysis of aluminum alkoxides. 146 grams of alum [$Al_2(SO_4)_3$] was dissolved in 800 cc of water and neutralized to a pH of 5.5 with ammonia. The alumina precipitate was recovered by filtration, washed with water, and divided into two portions. One portion was dried from the aqueous slurry. The second portion was filtered, slurried with 473 ml of ethanol, filtered, reslurried with a second 473 ml of ethanol, and dried. The results are shown below:

| | First Portion | Second Portion |
|---|---|---|
| Loose bulk density (lb/ft³) | 47.5 | 13.9 |
| Surface area (m²/g) | | 267 |
| Pore Volume (cc/g) | | 1.46 |
| Cumulative Pore Distribution | | |
| Pore diameter A (Second Portion) | | |
| 0–35 | | 0.01 |
| 50 | | 0.03 |
| 100 | | 0.10 |
| 150 | | 0.19 |
| 200 | | 0.27 |
| 250 | | 0.36 |
| 350 | | 0.52 |
| 500 | | 0.78 |
| 800 | | 1.03 |
| 1000 | | 1.16 |
| 2000 | | 1.24 |
| 5000 | | 1.37 |
| 10000 | | 1.46 |

EXAMPLE IX

A solution of sodium aluminate ($NaAlO_2$) containing 1 wt % $NaAlO_2$ was prepared by dissolving $NaAlO_2$ in water. The solution was carbonated with $CO_2$ until alumina precipitation was essentially complete. The alumina was washed 5 times with excess water to remove sodium ions and divided into a first and a second portion. The first portion was dried from the aqueous slurry. The second portion was filtered, washed with isopropanol, filtered, reslurried with isopropanol, and dried. The isopropanol was used in an amount equal to about 3 parts by weight of isopropanol per part of alumina filtercake. The test results are shown below.

| | First Portion | Second Portion |
|---|---|---|
| Loose bulk density (lb/ft³) | 55.0 | 10.6 |
| Surface area (m²/g) | 263 | 306 |
| Cumulative pore volume (cc/g) | 0.5 | 3.08 |
| Pore volume distribution (cc/g) | (Second Portion) | |
| 0–40 A | 0.01 | |
| 50 | 0.05 | |
| 65 | 0.18 | |
| 80 | 0.27 | |
| 100 | 0.34 | |
| 120 | 0.38 | |
| 150 | 0.46 | |
| 200 | 0.54 | |
| 250 | 0.62 | |
| 350 | 0.72 | |
| 500 | 0.82 | |
| 800 | 0.99 | |
| 1000 | 1.28 | |
| 2000 | 2.12 | |
| 5000 | 2.74 | |
| 10000 | 3.08 | |

While no extensive effort was devoted to optimizing process parameters on alumina slurries obtained by processes other than the hydrolysis of aluminum alkoxides, the effectiveness of solvent treatment of such slurries has been shown to illustrate that solvent treatment of aqueous alumina slurries is effective generally with such slurries to improve the properties of the alumina produced.

Having described the invention, I claim:

1. A method for producing low-density, high-porosity, high surface area alumina from an aqueous alumina slurry produced by the water hydrolysis of aluminum alkoxides and containing up to about 32 weight percent $Al_2O_3$, said method comprising:
    a. mixing said aqueous alumina slurry with an organic solvent selected from the group consisting of ethanol, propanol, isopropanol, butanol, isobutanol and tertiary butanol to form a solvent-aqueous alumina mixture containing said solvent in an amount equal to from about 25 to about 250 percent of the amount of solvent required to azeotropically remove the water from said aqueous alumina slurry upon drying said mixture,
    b. drying said solvent-aqueous alumina mixture; and,
    c. recovering alumina having a pore volume (0–10000 A) from about 1.0 to about 2.75 cc/g, a loose bulk density from about 7.5 to about 25 lb/ft³ and a surface area from about 260 to about 400 m²/g.

2. The method of claim 1 wherein said aqueous alumina slurry contains from about 5 to about 25 weight percent $Al_2O_3$ and is contacted with said organic solvent in an amount at least sufficient to form an azeotropic mixture with the water present.

3. The method of claim 2 wherein said aqueous alumina slurry contains from about 10 to about 20 weight percent $Al_2O_3$.

4. The method of claim 1 wherein said alumina has a loose bulk density from about 9 to about 15 lb/ft$^3$, a pore volume from about 1.5 to about 2.75 cc/g and a surface area from about 300 to about 400 m$^2$/g.

5. In a method for producing alpha alumina monohydrate by the water hydrolysis of aluminum alkoxides containing from about 1 to about 30 carbon atoms, said method consisting of a. reacting said aluminum alkoxides with an aqueous solution to produce an aqueous alumina slurry and an organic portion;

b. separating said organic portion and said aqueous alumina slurry; and c. drying said aqueous alumina slurry, the improvement comprising; mixing an organic solvent selected from the group consisting of ethanol, propanol, isopropanol, butanol, isobutanol, and tertiary butanol with said aqueous alumina slurry to form a solvent-aqueous alumina mixture containing said solvent in an amount equal to from about 25 to about 250 percent of the amount of said solvent required to azeotropically remove the water from said aqueous alumina slurry prior to drying.

6. The improvement of claim 5 wherein said solvent is present in an amount equal to from about 25 to about 250 percent of the amount of solvent required to remove the water present in said aqueous alumina slurry.

* * * * *